United States Patent [19]

Christman

[11] 4,353,684

[45] Oct. 12, 1982

[54] PRESSURE LIMITING DEVICE

[75] Inventor: Ross D. Christman, Ellicott City, Md.

[73] Assignee: Superpressure, Inc., Silver Spring, Md.

[21] Appl. No.: 184,243

[22] Filed: Sep. 5, 1980

[51] Int. Cl.³ .......................... F04B 43/06; F16K 5/00
[52] U.S. Cl. .................................. 417/388; 137/512.3; 137/540
[58] Field of Search ............... 417/383, 384, 385, 386, 417/387, 388, 389; 137/512.3, 540

[56] References Cited

U.S. PATENT DOCUMENTS

| | | | |
|---|---|---|---|
| 1,651,964 | 12/1927 | Nelson | 417/388 |
| 1,804,897 | 5/1931 | Thomas | 137/540 X |
| 1,961,918 | 6/1934 | West | 417/388 X |
| 2,160,295 | 5/1939 | Stewart | 417/388 X |
| 2,568,026 | 9/1951 | Pigott | 137/540 X |
| 2,753,805 | 7/1956 | Boivinet | 417/388 |
| 2,971,465 | 2/1961 | Caillaud | 417/388 |
| 3,338,170 | 8/1967 | Swartz | 417/388 |
| 3,416,453 | 12/1968 | Feuillebois | 417/388 |
| 3,433,161 | 3/1969 | Vetter | 417/388 |
| 4,049,017 | 9/1977 | Jones | 137/543.17 |

FOREIGN PATENT DOCUMENTS 864365 4/1941 France ................................ 417/385

Primary Examiner—Leonard E. Smith
Attorney, Agent, or Firm—Herman L. Gordon

[57] ABSTRACT

The pressure limiting device is used with a diaphragm pump for controlling the forces applied to the diaphragm. The device includes a body having a pressure control chamber therein. The body has an inlet to the chamber which is adapted to be coupled to a working chamber in the diaphragm pump. The body is provided with a first outlet opening from the control chamber and the body has therein a first poppet valve including a first valve seat at the first outlet opening facing into a larger cross-section first poppet-valve chamber. A first poppet is positioned in the first poppet valve chamber and engages the first valve seat. A spring assembly is situated in the first poppet valve chamber for urging the first poppet against the first valve seat at a first predetermined force. An outlet opening from the first poppet-valve chamber is adapted to be connected to a sump for the working liquid. In the body the pressure control chamber has a second outlet opening and a second poppet valve within the body including a second valve seat at the second opening facing into a larger cross-section second poppet-valve chamber. A second poppet is positioned in the second poppet-valve chamber and engages at one end thereof the second valve seat. Another spring assembly is situated in the second poppet-valve chamber for urging the second poppet against the second valve seat at a second predetermined force. The body has a bore in which a pin is received for acting on the second poppet and the pressure of the pumped fluid is applied to the outer end of the pin to urge the pin against the second poppet to provide additional force on the second poppet. An outlet from the second poppet-valve chamber communicates with the first poppet-valve chamber for coupling the second poppet-valve chamber to the sump for the working liquid. The second poppet-valve is opened at low pressures of the pumped fluid by the working liquid acting thereagainst with the first poppet-valve being opened at high pressures of the pumped fluid by the pressure of the working liquid acting thereagainst to relieve pressurized fluid from the working compartment thereby to limit the forces placed on the diaphragm at low pressures of the pumped fluid and high pressures of the working liquid.

12 Claims, 2 Drawing Figures

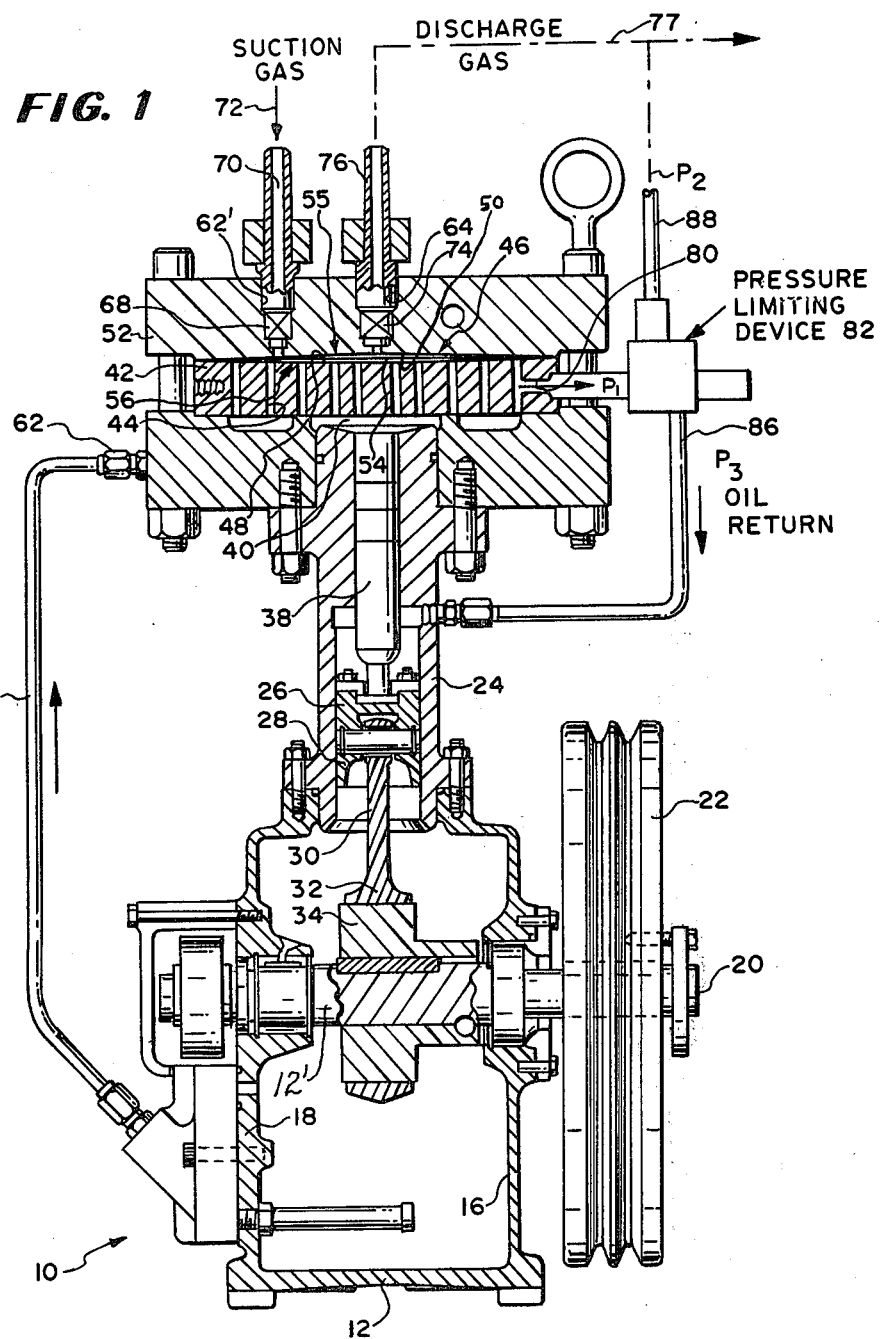

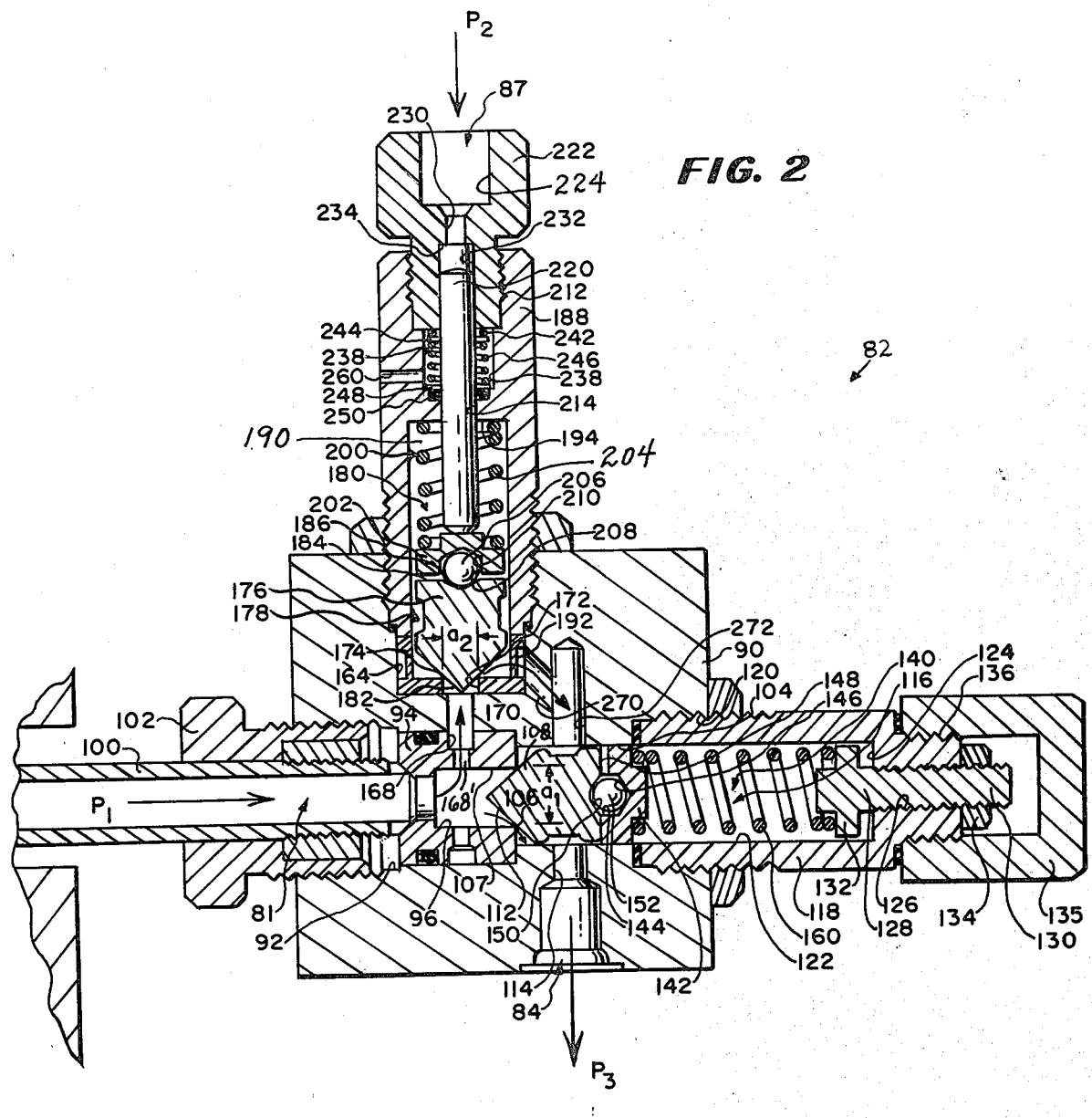

PRESSURE LIMITING DEVICE

BACKGROUND OF THE INVENTION

Field of the Invention

The present invention relates to a pressure limiting device utilized with a diaphragm pump for limiting the forces placed on the diaphragm of the diaphragm pump at low pressure of the pumped fluid and high pressure of the working liquid.

Description of the Prior Art

The pressure limiting device of the present invention is designed for use with diaphragm pumps of the type disclosed in U.S. Pat. No. 3,416,453. Such a pump has a pumping chamber with a diaphragm in the chamber and separating the chamber into a working compartment and a pumping compartment. A fluid conduit including a one way inlet valve is coupled to the pumping compartment and an outlet conduit containing a one way outlet valve is also coupled to the pumping compartment for permitting compressed fluid to exit from the pumping compartment. The working compartment is coupled to a piston of a pump so that on each return stroke of the piston working liquid is drawn into the pumping compartment through a one way valve and at the same time fluid is induced through the one way inlet valve into the pumping compartment. On the forward stroke of the piston, pressure is applied to the working liquid drawn into the working compartment so that the pressurized working liquid acts against the diaphragm to compress the fluid in the pumping compartment and force the compressed fluid out of the pumping compartment through the one way outlet valve means.

At the beginning of a cycle of pumping fluid, the pressure of the pumped fluid is very low and the pressurized working liquid acting on the diaphragm, on the other side of which there is very little resistance, can cause stretching and damage to the diaphragm. Likewise, when the pressure of the pumped fluid is very high, the pressurized working liquid acting on the diaphragm needs to be relieved. This need for limiting the pressure of a working liquid acting on a diaphragm in a diaphragm pump has been known for a long time in the art and various assemblies and devices have been proposed for limiting the pressure applied to the diaphragm in a diaphragm pump.

For example, in U.S. Pat. No. 3,416,453, there is disclosed a pressure limiter having a piston which has differential operating surfaces acting on either end thereof. The piston itself acts against one side of a spring and the other side of the spring bears against a poppet of a poppet valve. The pressure of the discharge gas being pumped by the diaphragm pump is applied to both operating surfaces, one surface being greater than the other. The smaller operating surface urges the piston away from a poppet closed position and the larger surface urges the piston toward a poppet closed position. When the pressure of the gas being pumped is low, the differential force, that is, the pressure times the area of the larger surface minus the pressure times the area of the smaller surface, is low, a very small force urges the piston against the spring and toward a poppet closed position such that if there is a surge of oil pressure of the working oil/liquid used to operate the diaphragm pump greater than the pressure of the spring, the poppet valve will open to discharge oil through an outlet.

However, if the differential pressure is high after the gas being pumped has been pumped to a higher pressure, a very high operating pressure of the oil acting against the poppet will compress the spring and allow the excess oil to discharge through the outlet.

Thus, the pressure of the discharge gas being pumped is applied to the poppet valve to enable same to be opened at a low pressure when the pressure of the discharge is low and the spring of the spring biased poppet valve will allow the poppet to be opened when the pressure is high and exceeds a pressure in excess of the spring force acting on the poppet.

Other pressure limiting assemblies utilized with diaphragm type pumps or compressors are also disclosed in the following patents:

| U.S. PAT. NO. | PATENTEE |
| --- | --- |
| 2,753,805 | Boivinet |
| 2,971,465 | Caillaud |
| 3,775,030 | Wanner |
| 4,019,837 | Eull |

The Boivinet U.S. Pat. No. 2,753,805 discloses a pressure relief mechanism wherein a regulator is designed for guarding against the differences in pressure which are exerted on a diaphragm of a diaphragm pump and utilizes a second diaphragm exposed to the pumping compartment, several check valves and a poppet valve.

The Caillaud U.S. Pat. No. 2,971,465 discloses a diaphragm pump which includes a small diaphragm operated valve for sensing the pressure of the discharge gas and utilizing that sensed pressure for controlling the pressure of the working fluid.

The Wanner U.S. Pat. No. 3,775,030 discloses a valve assembly which allows the fluid being pumped in a pumping or transfer chamber to controllably leak from the transfer chamber to a reservoir thus preventing excess pressure on the motive fluid side of the diaphragm in the pump.

The Eull U.S. Pat. No. 4,019,837 discloses a pressure unloading apparatus for a diaphragm pump which includes a poppet type valve allowing excess pressure of motive fluid on the motive fluid side of the diaphragm to operate the valve against the action of a spring to allow the excess pressurized fluid to be drained back to a reservoir. The apparatus also includes a sensing diaphragm acting on the opposite end of the valve in position to monitor the pressure of fluid being pumped as it exits from the pumping or transfer chamber.

As will be described in greater detail hereinafter, the pressure limiting device of the present invention differs from the previously proposed pressure regulators or pressure limiters by providing a device of simple construction including a body having a pressure control chamber therein which is adapted to be connected to the working liquid compartment of the pumping chamber in a diaphragm pump. Two poppet valve assemblies are mounted within the body in communication with the pressure control chamber. The first poppet valve assembly is designed to relieve high pressure working liquid from the working chamber and the second poppet valve assembly has a poppet which is urged toward an opening to the pressure control chamber by a spring and by the pressure of the pumped fluid so that at low pressures of the pumped fluid the working liquid acting against the poppet can cause opening of the second poppet to relieve pressurized working liquid from the working compartment.

SUMMARY OF THE INVENTION

According to the invention there is provided for use with a diaphragm pump, a pressure limiting device including a body having a pressure control chamber therein, an inlet in said body to said pressure control chamber adapted to be coupled to a working chamber in a diaphragm pump, a first outlet opening from said control chamber, a first poppet valve including a first valve seat at said first outlet opening facing into a larger cross-section first poppet-valve chamber, a first poppet in said first poppet-valve chamber engaging said first valve seat, means in said first poppet-valve chamber for urging said first poppet against said first valve seat at a first predetermined force, outlet means from said poppet-valve chamber adapted to be connected to a sump for the working liquid, a second outlet opening from said pressure control chamber, a second poppet valve including a second valve seat at said second opening facing into a larger cross-section second poppet-valve chamber, a second poppet in said second poppet-valve chamber engaging at one end thereof said second valve seat, means in said second poppet-valve chamber for urging said second poppet against said second valve seat at a second predetermined force, means for facilitating the application of additional force, directly related to the pressure of the pumped fluid, to the other end of said second poppet, and outlet means from said second poppet-valve chamber adapted to be coupled to the sump for the working liquid.

Further according to the invention there is provided an improved pressure limiting device for use in a diaphragm pump of the type having a pumping chamber, a diaphragm separating the chamber into a working compartment and a pumping compartment, one way inlet means for admitting fluid to the pumping compartment and one way outlet means for permitting compressed fluid to exit from the pumping compartment, means for drawing a quantity of working liquid into the pumping compartment and at the same time educing fluid into the pumping compartment through the one way inlet means, means for applying pressure to the working liquid drawn into the working compartment so that the pressurized working fluid acts against the diaphragm to compress the fluid in the pumping compartment and force the compressed fluid out of the pumping compartment through the one way outlet means, and means for limiting pressure of the working liquid relative to the pressure of the pumped fluid exiting from the one way outlet means and relative to the pressure of the working liquid in the working compartment, said pressure limiting means comprising said improved pressure limiting device which includes a body having a pressure control chamber therein, an inlet in said body to said pressure control chamber coupled to the working chamber, a first outlet opening from said control chamber, a first poppet valve including a first valve seat at said first outlet opening facing into a larger cross-section first poppet-valve chamber, a first poppet in said first poppet-valve chamber engaging said valve seat, means in said first poppet-valve chamber for urging said first poppet against said first valve seat at a predetermined force, means for communicating said first poppet valve chamber to a sump for the working liquid, a second outlet opening from said pressure control chamber, a second poppet valve including a second valve seat at said second opening facing into a larger cross-section second poppet-valve chamber, a second poppet in said second poppet-valve chamber engaging, at one end thereof, said second valve seat, means in said second poppet-valve chamber for urging said second poppet against said second valve seat at a second predetermined force, means for applying additional force directly related to the pressure of the pumped fluid to the other end of said second poppet, and means communicating said second poppet-valve chamber to the sump for the working liquid, said second poppet valve being opened at lower pressures of the pumped fluid by the working liquid acting thereagainst and said first poppet valve being opened at high pressures of the pumped fluid by the pressure of the working liquid acting thereagainst to relieve pressurized liquid from the working compartment and thereby limit the forces placed on the diaphragm.

Still further according to the invention there is provided for use in a poppet-valve assembly including a body, a poppet-valve chamber in said body, means for venting said chamber, an inlet opening to said chamber with a valve seat at said opening, a poppet in said chamber having a seating surface at one end thereof for engaging said valve seat, and means for urging said poppet against said valve seat including self-aligning valve-seating means.

BRIEF DESCRIPTION OF THE DRAWINGS

FIG. 1 is a vertical sectional view of a diaphragm pump having the pressure limiting device of the present invention coupled thereto.

FIG. 2 is an enlarged vertical sectional view of the pressure limiting device of the present invention.

DESCRIPTION OF THE PREFERRED EMBODIMENT

Referring to the drawings in greater detail there is illustrated in FIG. 1 a diaphragm pump 10 which is of the type disclosed in U.S. Pat. No. 3,416,453. As shown, the diaphragm pump 10 includes a crank shaft 12' extending through a crankcase 12 forming a reservoir or sump for a working liquid such as oil. The crank shaft 12' is journalled in opposite side walls 16 and 18 of the crankcase 12 through which it extends and has an extending shaft portion 20 on which is mounted a pulley 22 for driving the pump 10. A cylinder 24 is coupled to the top of crankcase 12 and a piston 26 is received therein. Lower end 38 of the piston 26 is connected to a connecting rod 30 which is rotatably journalled on the crank shaft 12'. In this respect, lower end 32 of the connecting rod 30 has an annular configuration and is journalled on an eccentric member 34 mounted on the crankshaft 12' such that rotation of the crank shaft 12' rotates the eccentric member 34 within the annular lower end 32 of the connecting rod 30 so that the connecting rod 30 is caused to move up and down to move the piston 26 up and down within the cylinder 24 driving a reduced pump piston element 38.

The upper end of the cylinder 24 is connected to an oil chamber 40 which is exposed to the bottom of an oil plate 42 having a plurality of ports 44 therethrough which communicate with a saucer or disc shaped chamber 46 which has a lower concave side 48 on the top of the oil plate 42 and an upper concave side 50 on a block member 52 referrred to as a gas head 52. A diaphragm 54 extends across the saucer chamber 46 so as to divide the chamber 46 into a pumping compartment 55 above the diaphragm 54 and a working compartment 56 below the diaphragm 54. The working compartment 56 can also be considered as including the ports 44 through the oil plate 42 and the oil chamber 40.

An oil conduit 60 from the bottom of the reservoir in the crankcase 12 is coupled through a check valve 62 to the oil chamber 40 so that on a downstroke of the piston 26, oil is educed from the crankcase 12, and sucked into the oil chamber 40 through the check valve 62.

As shown, the gas head 52 has an inlet passageway 62' and an outlet passageway 64. A one way inlet valve 68 is mounted in the inlet passageway 62' and a fitting 70 extends from the inlet passageway 62' for coupling to a gas inlet conduit 72.

Similarly, a one way outlet valve 74 is mounted in the outlet passageway 64 and a fitting 76 extends from the outlet passageway 64 for connection to a gas discharge conduit 77.

In the operation of the pump 10, a downward stroke of the piston 26 will draw oil through the conduit 60 and check valve 62 into the oil chamber 40 and at the same time it will draw the diaphragm 54 downwardly against the top of the oil plate 42. At the same time, gas will be drawn through the one way inlet valve 68 into the expanded pumping chamber 55 which is the space above the diaphragm 54 and beneath the underside 50 of the gas head 52. Then, on a return stroke of the piston 26, the oil in the oil chamber 40 is placed under pressure and is forced through the ports 44 to force the diaphragm 54 upwardly to reduce the volume of the pumping compartment 55 and force compressed gas through the outlet valve 74.

The construction of the diaphragm pump 10 described above is conventional and forms no part of the present invention.

In accordance with the teachings of the present invention, an outlet 80 from the oil plate 42 is connected to an inlet 81 (FIG. 2) of a pressure limiting device 82 construced and operated in accordance with the teachings of the present invention.

An outlet 84 (FIG. 2) from the pressure limiting device 82 is coupled through a conduit 86 to the cylinder 24 for return to the sump or reservoir in the crankcase 12.

Another inlet opening 87 (FIG. 2) to the pressure limiting device 82 is coupled by a conduit 88 to the gas discharge conduit 77.

Referring now to FIG. 2, the pressure limiting device 82 includes a body 90 which has a first bore 92 therein which forms the inlet 81 and in which is received a plug 94 having a cylindrical cavity 96 therein forming a pressure control chamber 96. This plug 94 forms part of a connector for connecting a tubing 100 from the outlet 80 from the oil plate 42 with a fitting 102 received in the first bore 92 and against the plug 94.

A smaller, second bore 104 extends into the opposite side of the block 90 and in line with the first bore 92 and communicates with the first bore 92. A circular corner 106 at an end opening 107 of the cylindrical cavity/pressure control chamber 96 at the end of the plug 94 opening into the second bore 104 forms a first valve seat 106 of a first poppet valve 108. This poppet valve 108 includes a poppet having a conical seating surface 112 which seats against the circular corner/valve seat 106 of the cylindrical cavity 96. The end opening 107 defines a first opening 107 from the pressure control chamber 96 and the circular corner 106 defines a first valve seat 106.

As shown, a third bore 114 in the block 90 communicates with the second bore 104 and is coupled to the oil return conduit 86.

The second bore 104 forms part of a first poppet-valve chamber 116 in cooperation with a threaded bushing 118 which is threaded into a counter-bored portion 120 of the second bore 104. The bushing 118 has a cylindrical cavity 122 therein which opens into and forms part of the first poppet-valve chamber 116. An inner end wall 124 of the bushing 118 has a threaded bore 126 therethrough communicating with the cylindrical cavity 122. Positioned in the threaded bore 126 is a stem 128 which is threaded on one end portion 130, the threaded end portion 130 being received in the threaded bore 126, and has a collar 132 at the other end forming a stop 132. The threaded end portion 130 extends through the bore 126 and has a nut 134 thereon for locking the stem 128 in place. Also a cap 135 is received around an outer end 136 of the bushing 118 for enclosing the nut 134 and the threaded end portion 130.

Positioned between the collar forming stop 132 and the first poppet 108 is an assembly 140 for urging the first poppet valve 108 against the first valve seat 106. This assembly 140 includes a follower 142 having a cavity 144 therein which has a conical bottom 146 and which faces backside of 148 of the first poppet 108. The backside 148 of the first poppet 110 has a mating conical cavity 150. A ball bearing 152 is received between the follower 142 and the first poppet 110 within the cavities 144, 150. A spring 160 is positioned between the follower 142 and the stop 132 which is adjustable by means of the threaded mounting of the stem 128 so that by unthreading the nut 134 and turning the stem 128, one can adjust the distance of the collar forming stop 132 from the first valve seat 106.

The follower 142, the ball bearing 152, the mating cavities 144, 150 in the follower 142 and the first poppet 108 form a self-aligning valve-seating mechanism. In this respect, the ball bearing enables the first poppet 108 to properly seat on the first valve seat 106.

The body 90 also has a fourth bore 164 therein which extends at right angles to the first and second bores 92, 104 and which extends toward but not to the first bore 92. Between the first bore 92 and the fourth bore 164 is a passageway 168 and the plug 94 has a port 168' therethrough communicating with the passageway 168. It will be apparent that the port 168' is of a smaller cross-section than the cylindrical cavity 96 forming the pressure control chamber 96 and the port 168' forms a second outlet opening from the pressure control chamber 96.

Positioned in the bottom of the fourth bore 164 is an annular member 170 having a central opening 172 therethrough slightly larger than the passageway. A cylindrical inner corner edge 174 of the annular member 170 opening into the fourth bore 164 defines a second valve seat 174 of a second poppet valve 176.

The second poppet valve assembly 176 includes the valve seat 174 formed on the annular member 170 and a second poppet element 178 positioned in the fourth bore 164, which defines part of a second poppet-valve chamber 180. The second poppet element 178 has a conical surface 182 at one end thereof for seating on the valve seat 174 and a flat backside 184 with a conical cavity 186 therein.

An upper fitting 188 is threadedly received into the fourth bore 164 and has a cylindrical cavity 190 therein which mates with a collar member 192 positioned in the fourth bore 164 between the annular member 170 and an inner end 194 of the fitting 188. The space within the collar member 192 and the cylindrical cavity 190 defines second poppet-valve chamber 180. Within the chamber 180 is an assembly 200 for urging the second poppet element 178 against the second valve seat 174. The assembly 200 includes a follower 202, a spring 204 between the follower 202 and the upper end of the cylindrical cavity 190, and a ball bearing 206 between the follower 202 and the second poppet element 178. It will be apparent that the follower 202 has a cavity 208 on one side thereof facing and in alignment with the cavity 186 in the second poppet element 178. The cavity 208 has a conical bottom 210 so that the ball bearing 206 can be received between and seat within the cavities 186 and 208. This arrangement provides another self-aligning valve-seating mechanism to ensure that the second poppet element 178 properly seats on the second valve seat 174.

The upper fitting 188 has a counter-bored portion 212 extending into and toward the cylindrical cavity 190. Between the counter-bored 212 portion and the cylindrical cavity is a through-bore 214 in which is received a pin 220. A plug 222 is threadedly fixed into the counter-bored portion 212 and has an upper cylindrical cavity 224 opening onto the upper end thereof for receiving the conduit 88 connected to the gas discharge conduit 77. A passageway 230 communicates between this cavity 224 and a lower bore 232 in the plug 222 sized to receive the upper end of the pin 220. The upper end of the pin 220 seats against an upper end wall 234 of the bore 232 within the plug 222 and the lower end of the pin 220 seats against the follower 202, as shown.

Part 238 of the counter-bored portion 212 beneath the plug 222 has a sealing assembly therein including an upper O-ring 242, an upper washer 244, a spring 246, a lower washer 248, and a lower O-ring 250. The O-rings 242, 250 permit the sealing assembly to slidably engage the pin 220 to permit slidable movement of the pin 220 without leakage of working liquid or pumped fluid. However, since there may be movement of the O-rings 242, 250 and the spring 246, a port 260 is provided in the fitting 188 for venting the part 238 of the counter-bored 212 where the sealing assembly is mounted.

An angular passageway 270 extends from the fourth bore 164 to an extension 272 of the third bore 114 into the block 90 so that when the second poppet valve 176 is opened, pressurized working fluid can flow through the passageway 168, the second poppet valve chamber 180, angular passageway 270, the third bore 114, the first poppet valve chamber 116 to the oil return conduit 86.

It will be apparent that the working surface exposed to the first outlet opening 64, i.e., to the pressure control chamber 96, has a diameter $a_1$ and the working surface of the second poppet element 178 exposed to the liquid passing through the passageway 168' and the second outlet opening 168 is $a_2$ and is smaller than the diameter $a_1$.

In the operation of the pressure limiting device 82, the pressure $P_1$ of the working liquid in the oil chamber 40 and in the working compartment 56 of the diaphragm pump 10 is supplied to the pressure control chamber 96.

On start up of the pump 10, the pressure $P_2$ of the pumped gas is low and thus a low pressure is applied to the pin 220 and essentially only the spring 204 is acting on the second poppet element 178. The pressure $P_1$ of the working fluid acting on the working surface defined by the diameter $a_2$ of the second poppet valve 176 is then sufficient to force the second poppet valve 176 open to allow working liquid to pass through the pressure control chamber 96 passageway 168, second outlet opening 168', angular passageway 270 and third bore 114 to the oil return conduit 86. However, as the pressure of the pumped gas builds up, the pressure acting on the pin 220 prevents the second poppet 176 from opening. When the pressure of the pumped gas teaches a certain point, the pressure of the working fluid acting against the first poppet 108 is then sufficient to overcome the force of the spring 160 and then the first poppet valve 108 is opened to allow working liquid to escape from the pressure control chamber 96 through the second bore 104 forming part of the first poppet-valve chamber 116 and through the third bore 114 to the oil return conduit 86. In this way, the forces applied to the diaphragm 54 are limited by the pressure limiting device 82.

It will be apparent from the foregoing description that the pressure limiting device 82 of the present invention has built therein two poppet/relief valves 108 and 176, one, valve 108, that is set to limit the maximum operating pressure of the working fluid and the other, valve 176, set to limit the differential pressure between the liquid side and the gas side of the diaphragm 54.

The particular construction of the pressure limiting device 82 with the adjustable collar forming stop 132 enables the maximum relief pressure to be simply set and in a manner separate from the operation of the second poppet/relief valve 176 which coacts with the gas discharge pressure. Also, rather than maintaining a pressure differential based on gas discharge pressure, a constant differential is maintained. This allows sufficient pressure for deflecting the diaphragm and operating the gas delivery/inlet check valve 68 without putting a high mechanical stress on the diaphragm 54.

Further, with the pressure limiting device 82 of the present invention, when the gas discharge pressure is below the maximum operating pressure, the oil pressure, $P_1$, acts on a working surface area $a_2$ which is the area sealed by the first poppet 108 on the first valve seat 106.

It will be apparent from the foregoing description that the pressure limiting device 82 of the present invention has a number of advantages, some of which have been described above, and others of which are inherent in the invention. Primarily the pressure limiting device 82 is a simple mechanical double poppet relief valve arrangement which limits the forces applied upon a diaphragm at low pumped fluid pressures and high working liquid pressures. Also, it will be apparent to those skilled in the art that obvious modifications of the pressure limiting device of the present invention can be made without departing from the teachings of the present invention. Accordingly, the scope of the present invention is only to be limited as necessitated by the accompanying claims.

I claim:

1. For use with a diaphragm pump, a pressure limiting device including a body having a pressure control chamber therein, an inlet in said body to said pressure control chamber adapted to be coupled to a working chamber in the diaphragm pump, a first outlet opening from said control chamber, a first poppet valve including a first valve seat at said first outlet opening facing into a larger cross-section first poppet-valve chamber, first poppet in said first poppet-valve chamber engaging said first valve seat, means in said first poppet-valve chamber for urging said first poppet against said first valve seat at a first predetermined force, outlet means from said first poppet-valve chamber adapted to be connected to a sump for the working liquid id, a second outlet opening from said pressure control chamber, a second poppet valve including a second valve seat at said second opening facing into a larger cross-section second poppet-valve chamber, a second poppet in said second poppet-valve chamber engaging at one end thereof said second valve seat, means in said second poppet-valve chamber for urging said second poppet against said second valve seat at a second predetermined force, means for facilitating the application of additional force, directly related to the pressure of the pumped fluid, to the other end of said second poppet, and outlet means from said second poppet-valve chamber adapted to be coupled to the sump for the working liquid.

2. An improved pressure limiting device for use in a diaphragm pump of the type having a pumping chamber, a diaphragm separating the chamber into a working compartment and a pumping compartment, one way inlet means for admitting fluid to the pumping compartment and one way outlet means for permitting compressed fluid to exit from the pumping compartment, means for drawing a quantity of working liquid into the pumping compartment and at the same time educing fluid into the pumping compartment through the one way inlet means, means for applying pressure to the working liquid drawn into the working compartment so that the pressurized working liquid acts against the diaphragm to compress the fluid in the pumping compartment and force the compressed fluid out of the pumping compartment through the one way outlet means, and means for limiting pressure of the working liquid relative to the pressure of the pumped fluid exiting from the one way outlet means and relative to the pressure of the working liquid in the working compartment, said pressure limiting means comprising said improved pressure limiting device which includes a body having a pressure control chamber therein, an inlet in said body to said pressure control chamber coupled to the working chamber, a first outlet opening from said control chamber, a first poppet valve including a first valve seat at said first outlet opening facing into a larger cross-section first poppet-valve chamber, a first poppet in said first poppet-valve chamber engaging said valve seat, means in said first poppet-valve chamber for urging said first poppet against said first valve seat at a first predetermined force, means for communicating said first poppet-valve chamber to a sump for the working liquid, a second outlet opening from said pressure control chamber, a second poppet valve including a second valve seat at said second opening facing into a larger cross-section second poppet-valve chamber, a second poppet in said second poppet-valve chamber engaging, at one end thereof, said second valve seat, means in said second poppet-valve chamber for urging said second poppet against said second valve seat at a second predetermined force, means for applying additional force directly related to the pressure of the pumped fluid to the other end of said second poppet, and means communicating said second poppet-valve chamber to the sump for the working liquid, said second poppet valve being opened at low pressures of the pumped fluid by the working liquid acting thereagainst and said first poppet valve being opened at high pressures of the pumped fluid by the pressure of the working liquid acting thereagainst to relieve pressurized liquid from the working compartment and thereby limit the forces placed on the diaphragm.

3. The device according to claim 2 wherein said second outlet opening from said pressure control chamber is smaller than said first outlet opening and wherein said body has passage means between said pressure control chamber and said second poppet-valve chamber which passage means has a narrow portion with a smaller cross-section than the cross-section of said second outlet opening.

4. The device according to claim 1 wherein said second outlet opening is smaller than said first outlet opening such that the active surface area of said first poppet is greater than the active surface area of said second poppet.

5. The device according to claim 2 wherein said means for communicating said second poppet-valve chamber to the sump includes a passageway between said second poppet-valve chamber and said first poppet-valve chamber.

6. The device according to claim 2 wherein said means for urging said first poppet against said first valve seat includes an adjustable stop mounted in said first poppet-valve chamber opposite said first opening, a spring in said chamber between said stop and said first poppet, and means for adjustably fixing said stop at various distances from said first opening.

7. The device according to claim 2 wherein said second poppet-valve includes a bore in said body communicating with said second poppet-valve chamber, a pin received in said bore, friction seal means associated with said bore and slidably engagedy by said pin, one end of said pin acting against said second poppet with the pressure of the pumped fluid being applied to the other end of said pin.

8. The device according to claim 2 wherein said means for urging said second poppet against said second valve seat at a predetermined force is a spring positioned in said second poppet-valve chamber between said poppet and an end wall of said second poppet-valve chamber.

9. The device according to claim 2 wherein said means for urging said first poppet against said first valve seat includes self-aligning valve-seating means for ensuring proper seating of said first poppet on said first valve seat.

10. The device according to claim 7 wherein said self-aligning valve-seating means includes a follower member having a cavity on one side thereof with said urging means bearing on the other side thereof, a similar cavity in said poppet facing, and in registry with, said cavity in said follower, and a ball bearing received in said cavities between said first poppet and said follower.

11. The device according to claim 2 wherein said means for urging said second poppet against said second valve seat includes self-aligning valve-seating means for ensuring proper seating of said second poppet on said second valve seat.

12. The device according to claim 11 wherein said self-aligning valve-seating means includes a follower member having a cavity on one side thereof with said urging means bearing on the other side thereof, a similar cavity in said second poppet facing, and in registry with, said cavity in said follower, and a ball bearing received in said cavities between said second poppet and said follower.

* * * * *